United States Patent
Kim et al.

(10) Patent No.: US 10,404,429 B2
(45) Date of Patent: *Sep. 3, 2019

(54) CHANNEL ADAPTATION FOR MULTICARRIER ARRANGEMENT

(71) Applicant: Lantiq Deutschland GmbH, Neubiberg (DE)

(72) Inventors: Joon Bae Kim, Lexington, MA (US); Patrick Kelliher, Chelmsford, MA (US)

(73) Assignee: Lantiq Deutschland GmbH, Neubiberg (DE)

( * ) Notice: Subject to any disclaimer, the term of this patent is extended or adjusted under 35 U.S.C. 154(b) by 79 days.

This patent is subject to a terminal disclaimer.

(21) Appl. No.: 15/586,588

(22) Filed: May 4, 2017

(65) Prior Publication Data

US 2017/0237536 A1    Aug. 17, 2017

Related U.S. Application Data

(63) Continuation of application No. 12/981,997, filed on Dec. 30, 2010, now Pat. No. 9,967,068.

(Continued)

(51) Int. Cl.
*H04L 5/00* (2006.01)
*H04M 11/06* (2006.01)

(52) U.S. Cl.
CPC .......... *H04L 5/0046* (2013.01); *H04L 5/0007* (2013.01); *H04L 5/0053* (2013.01); *H04L 5/0055* (2013.01); *H04M 11/06* (2013.01)

(58) Field of Classification Search
CPC ... H04L 5/0046; H04L 5/0007; H04L 5/0053; H04L 5/0055; H04M 11/06

(Continued)

(56) References Cited

U.S. PATENT DOCUMENTS 6,128,349 A * 10/2000 Chow ..................... H04L 5/023
370/464
6,829,307 B1    12/2004 Hoo et al.

(Continued)

OTHER PUBLICATIONS

Final Office Action dated Dec. 13, 2013 for U.S. Appl. No. 12/981,997.

(Continued)

*Primary Examiner* — Obaidul Huq
(74) *Attorney, Agent, or Firm* — Eschweiler & Potashnik, LLC

(57) ABSTRACT

Implementations related to updating channel adaptation parameters are described. In one implementation, an R2T frame, such as an acknowledgment (ACK) frame, is modified to carry a partial bit allocation table (BAT). The R2T frame may be received by a transceiver apparatus and the partial BAT carried in the header or extended header(s) of R2T frame may be used to update a BAT stored in the transceiver. In another implementation, a message frame is modified to carry a partial BAT. The message frame may be received by a transceiver apparatus and the partial BAT used to update a BAT stored in the transceiver. A unique identification number generated by the receiving transceiver apparatus may be used to synchronize BATs stored in two communicating transceivers without necessity of exchanging additional control messages.

31 Claims, 4 Drawing Sheets

Related U.S. Application Data

(60) Provisional application No. 61/291,325, filed on Dec. 30, 2009.

(58) Field of Classification Search
USPC ........................................ 370/310, 328, 329
See application file for complete search history.

(56) References Cited

U.S. PATENT DOCUMENTS

| | | |
|---|---|---|
| 2004/0174808 A1 | 9/2004 | Bolinth et al. |
| 2005/0213405 A1* | 9/2005 | Stopler ............... H04L 27/2608 365/203 |
| 2005/0238091 A1* | 10/2005 | Tzannes ................ H04L 1/0002 375/222 |
| 2009/0154927 A1 | 6/2009 | Oksman |

OTHER PUBLICATIONS

Non-Final Office Action dated May 7, 2013 for U.S. Appl. No. 12/981,997.

* cited by examiner

BIT ALLOCATION TABLE — 300

| TONE/SUB-CHANNEL (302) | BITS (304) | GAIN (DB) (306) |
| --- | --- | --- |
| 1 | 15 | +2.1 |
| 2 | 2 | -11.0 |
| 3 | 7 | -8.0 |
| 4 | 12 | +1.9 |
| 5 | 7 | -7.9 |
| 6 | 9 | -5.6 |
| 7 | 10 | +0.8 |
| ⋮ | ⋮ | ⋮ |
| N TONE | N BITS | N GAIN |

FIG. 3

CHANNEL ADAPTATION FOR MULTICARRIER ARRANGEMENT

PRIORITY

This application is a Continuation of U.S. application Ser. No. 12/981,997, which was filed on Dec. 30, 2010, which claimed priority to U.S. Provisional Application 61/291,325, which was filed on Dec. 30, 2009. The priority of the two identified prior filed applications is hereby claimed. The entire contents of the two identified prior filed applications are hereby incorporated herein by reference.

BACKGROUND

Packet-based communication technologies, such as ITU G.hn, HomePNA, HomePlug® AV and Multimedia over Coax Alliance (MoCA), are becoming increasingly important due to the significant advances in broadband networks capable of delivering multimedia-rich IP-based services. As the demand for such services increases, service providers are looking for improved ways to distribute digital content within consumers' homes. The aforementioned technologies are designed specifically for this purpose.

Digital subscriber line (DSL) technology may be used to transform an ordinary telephone line (e.g., copper wire twisted-pair) into a broadband communication link. DSL technology achieves this by sending signals over the telephone line in previously unused high frequencies.

Over the years, DSL technology has evolved into a family of specific, standardized implementations. These various implementations, which include among others Asymmetric Digital Subscriber Line (ADSL), ADSL2, ADSL2+, Very high speed DSL (VDSL), VDSL2, G.Lite, and High bit rate Digital Subscriber Line (HDSL), offer a variety of transmission speeds and transmission distances. It is common to refer to the various DSL implementations that have evolved over the years collectively as xDSL.

Wireless communication technology may be used in connection with DSL technology to increase the general mobility of devices that are used to access a broadband communication link. A common wireless communication technology used in connection with DSL technology and other broadband services includes the various IEEE 802.11 standards for wireless LANs.

Various xDSL implementations typically employ either Carrier-less Amplitude and Phase (CAP) modulation or discrete multi-tone (DMT) modulation. CAP modulation is a variation of quadrature amplitude modulation (QAM). CAP modulation produces the same form of signal as QAM without requiring in-phase and quadrature carrier components. DMT modulation is a modulation method in which the available bandwidth of a communication channel is divided into numerous orthogonal sub-channels. Sub-channel is also referred to as sub-carrier or tone. Each tone of a DMT communication system is capable of acting as a communications sub-channel that carries information between a transmitter and a receiver. Multicarrier systems that make use of DMT modulation may also be referred to as systems that employ Orthogonal Frequency Division Multiplexing (OFDM). OFDM is also the modulation method employed by many wireless communication technologies, including ITU G.hn, G.hnem, HomePlug® AV, MoCA, IEEE 802.11 and IEEE 802.16. Technologies implementing DMT, OFDM and other multicarrier modulation schemes are generalized herein as being multicarrier systems.

In various multicarrier modulation schemes, the number of data bits or the amount of information that a tone carries may vary from tone to tone, and it depends on the relative power of the data-bearing signal compared to the power of an interfering signal and/or background noise on that particular tone. One measure of the quality of a signal carried by a tone is the ratio of the received signal strength (power) over the noise strength in the frequency range of operation, or the Signal-to-Noise Ratio (SNR). Generally, a high SNR results in high signal quality being carried by a tone. Another measure of signal quality is bit error ratio (BER) for a given tone. In addition, another potential measure of signal quality is the likelihood of interferers at one or more frequencies.

Communication devices implementing multicarrier modulation schemes often go through a brief training period, also known as channel discovery phase or sounding phase before data communications begin. During the training period, test signals may be transmitted to effectively test the quality of the communication medium at various frequencies. Generally the medium quality is determined by measuring the SNR on each of the tones. The number of bits allocated to each tone is determined based in large part on the channel measurements such as detected training signals. Upon completion of the training period, most multicarrier modulation schemes implement a Bit Allocation Table (BAT) that specifies the number of bits modulated on each tone. In some cases it might be beneficial to load the same number of bits for all tones, which does not require BAT, but still can be considered as a special case of BAT.

After the training period and the establishment of a BAT used between communicating transceivers, the transmission medium often encounters changes that may affect the communication of information at the allocated bits on some of the tones. A known channel adaptation or channel tracking process may be used to replace a BAT used between communicating transceivers with a new BAT that includes bit allocation that sufficiently matches a current state of the transmission medium. However, the known channel adaptation processes may not provide effective channel adaptation for certain systems. For example, one or more such processes may have the drawback of taking a relatively large amount of time, which may lead to brief service interruptions under rapidly changing channel conditions.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

FIG. 3 illustrates an exemplary Bit Allocation Table (BAT) that may be updated in accordance with the described implementations. In one implementation, the exemplary transceiver apparatus illustrated in FIG. 2 may include one or more BATs.

DETAILED DESCRIPTION

Overview

The following description describes implementations related to updating one or more channel adaptation parameters associated with a transceiver device or the like. One such exemplary parameter is Bit Allocation table (BAT). In one implementation, a receiving transceiver may ascertain that one or more tones associated with a multicarrier arrangement should be assigned a different number of bits and/or gain amount. For convenience, this information is referred herein as a partial BAT update. Rather than initiating a lengthy control message exchange with the transmitting transceiver, the receiving transceiver may package or piggyback partial BAT update information in an existing frame format. In one implementation, the partial BAT update information may be packaged in a short management message carried in a payload of a frame that contains a data structure holding update data for only those tone indices that should be updated in a BAT stored in the transmitting transceiver. In another implementation, the partial BAT update information may be piggybacked in a header of a frame transmitted from the receiving transceiver to the transmitting transceiver. One such exemplary frame is an acknowledgement (ACK) frame. In another implementation, the partial BAT update information may be piggybacked in an extended header portion of a frame transmitted from the receiving transceiver to the transmitting transceiver. Again, the piggybacked partial BAT update information may include update data for only those tone indices that should be updated in a BAT stored in the transmitting transceiver.

As will be understood from this description, the implementations described herein may offer numerous advantages over conventional BAT replacement procedures. By way of example, the implementations described herein may reduce the ordinary amount of time required to allocate bits in a channel comprised of a plurality of tones. Furthermore, because the implementations herein may make use of existing frame and message formats, the execution and reallocation of bits and gains may be extremely efficient and quick. Additionally, the use of the implementations described herein may eliminate having to pass additional information prior to the execution of a channel adaptation process. That is, unlike conventional procedures for channel adaptation, the implementations described herein may eliminate control messages used to initiate and confirm a channel adaptation procedure. In addition, the implementations described herein may improve the reliability of a connection in situations demanding a rapid channel adaptation, thereby reducing the necessity and frequency of retraining transceivers.

Exemplary Communication Arrangement

Figure 1:
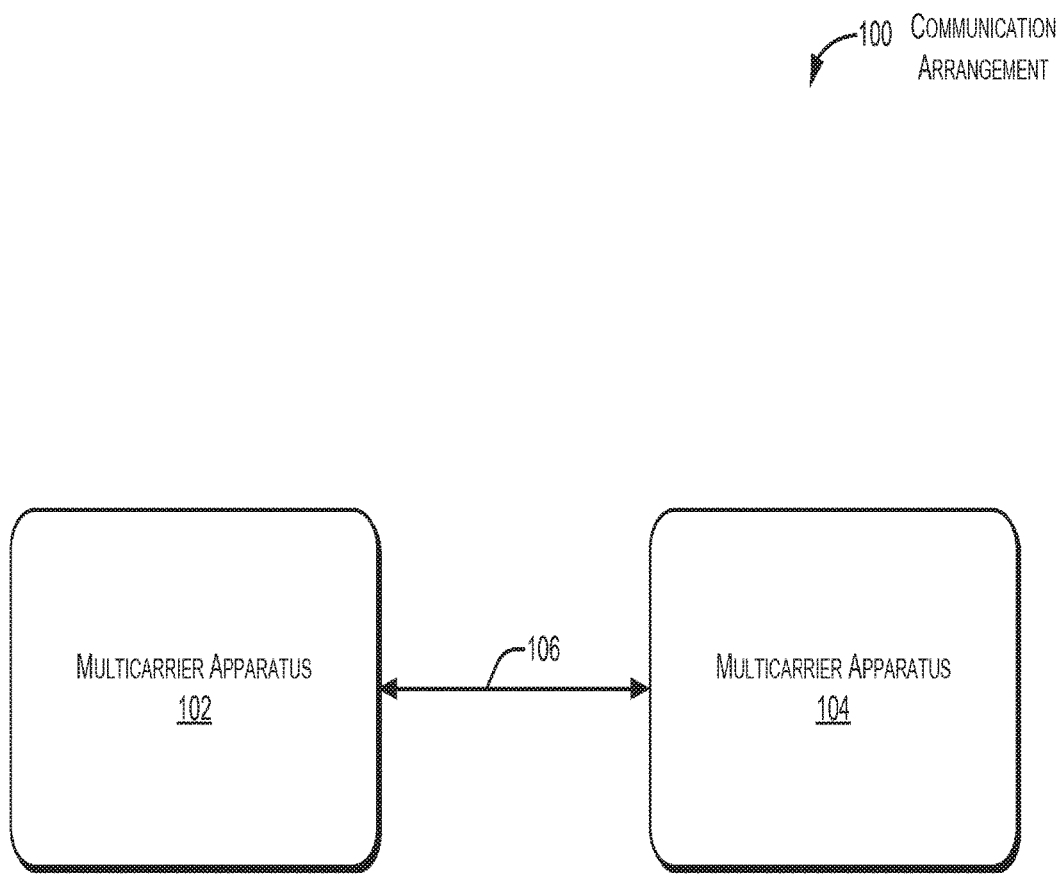
FIG. 1 illustrates an exemplary communication arrangement that employs at least two multicarrier apparatuses. In one implementation, the multicarrier apparatuses are Orthogonal Frequency Division Multiplexing (OFDM) capable apparatuses capable of implementing the described channel adaptation procedures.

FIG. 1 illustrates an exemplary communication arrangement 100 that employs at least two multicarrier apparatuses 102 and 104. In one implementation, the multicarrier apparatuses 102 and 104 are Orthogonal Frequency Division Multiplexing (OFDM) capable apparatuses capable of implementing the herein described channel adaptation procedures.

The multicarrier apparatuses 102 and 104 may communicate through a bidirectional communication channel 106. The communication channel 106 may be realized as a wireless medium or a wireline medium. Accordingly, the multicarrier apparatuses 102 and 104 may include structure and functionality that enables signal communication over such medium. Such structure and functionality may include one or more antennas, integrated wireline interfaces, and the like.

Furthermore, the multicarrier apparatuses 102 and 104 may be enabled to communicate using packet-based technology (e.g., ITU G.hn, HomePNA, HomePlug® AV and Multimedia over Coax Alliance (MoCA)) and xDSL technology. Such xDSL technology may include Asymmetric Digital Subscriber Line (ADSL), ADSL2, ADSL2+, Very high speed DSL (VDSL), VDSL2, G.Lite, and High bit rate Digital Subscriber Line (HDSL), as well as other packet based technologies such as xPON (Passive Optical Networks). In addition, the multicarrier apparatuses 102 and 104 may be enabled to communicate using IEEE 802.11 and IEEE 802.16 (WiMAX) wireless technologies.

Signals exchanged between the multicarrier apparatuses 102 and 104 may include multicarrier symbols that each include a plurality of tones or sub-channels. Each of the tones within a multicarrier symbol may have data bits modulated thereon that are intended for delivery from one of the multicarrier apparatuses 102 and 104 to the other. Some of the tones may be inferior to others because of certain channel effects, such as multipath fading. One technique to deal with non-uniformity between tones in a multicarrier channel is known as bit loading.

Bit loading is a technique where a different number of bits may be allocated to different tones in a multicarrier channel, based on a perceived quality of the various tones. That is, high quality tones may be allocated a larger number of bits, while low quality tones may be allocated a smaller number of bits (or no bits). The number of bits that are allocated to a particular tone may determine the type of modulation that is used to modulate a corresponding sub-carrier. For example, if 2 bits are allocated to a particular tone, then Quadrature Phase Shift Keying (QPSK) may be used as a modulation technique for the corresponding sub-carrier as it includes 2 bits per symbol. Alternatively, if 4 bits are allocated to a tone, 16 Quadrature Amplitude Modulation (16 QAM) may be used as a modulation technique for the corresponding sub-carrier as it includes 4 bits per symbol, and so on. Once the bit loading process is complete for each of the tones in a multicarrier channel, the designated bits and gains for each tone may be stored in a BAT.

It may be desirable to modify or otherwise change the bits and gains allocated to some or all of the tones in a multicarrier channel. This may occur when a receiving apparatus, such as one of the multicarrier apparatuses 102 and 104, observes a threshold number of errors being produced on one or more tones of the incoming signal. The implementations described herein are designed to facilitate rapid and efficient reallocation of bits to one or more tones using very little frame (i.e., packet) overhead. Furthermore, the implementations described herein are designed to enable transceiver apparatuses to rapidly and efficiently synchronize BATs.

Figure 2:
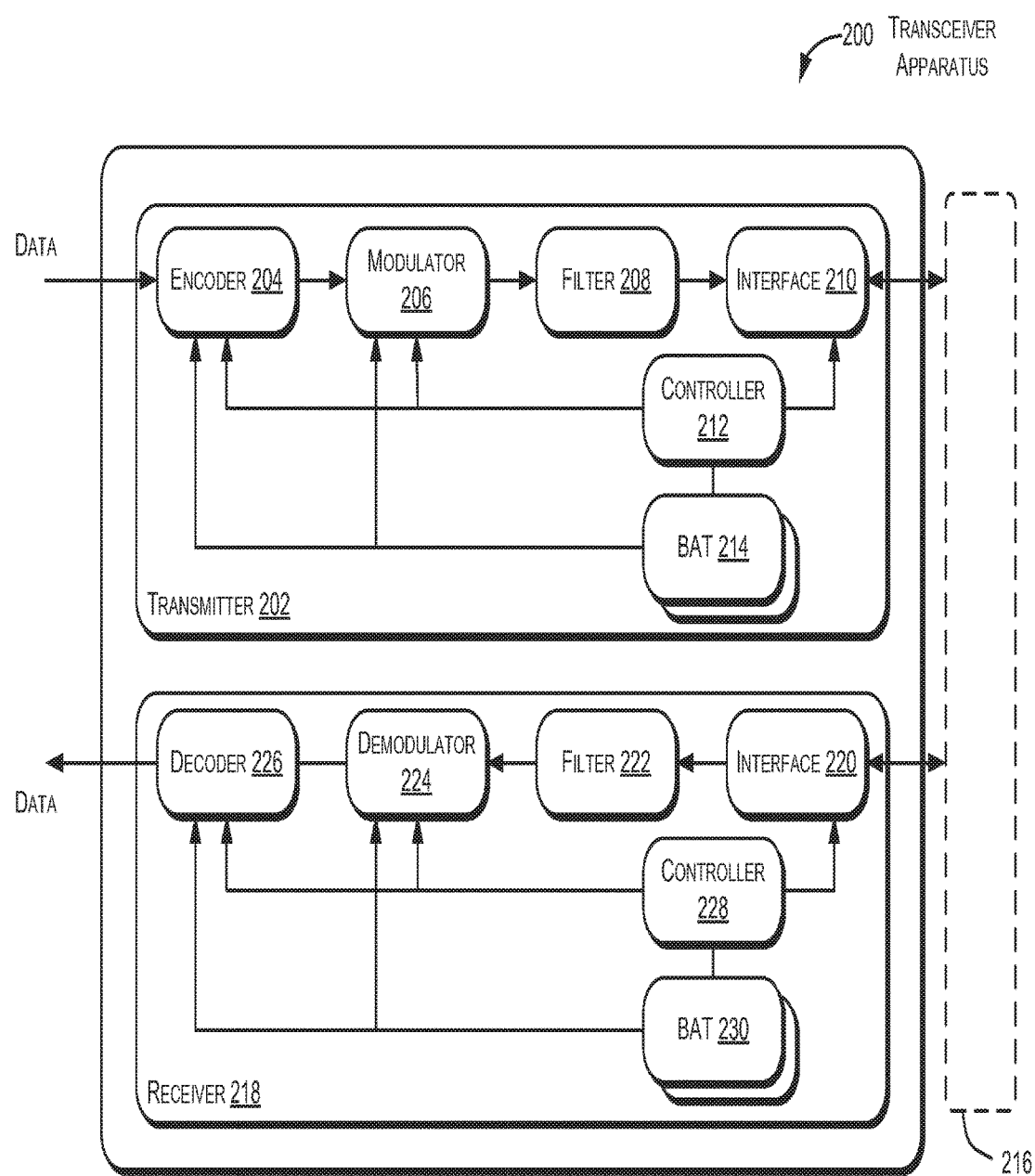
FIG. 2 illustrates an exemplary transceiver apparatus that may be used as a transmitting apparatus and receiving apparatus in a multicarrier arrangement or system. The multicarrier apparatuses illustrated in FIG. 1 may be implemented in the same or similar manner as the exemplary transceiver apparatus.

FIG. 2 illustrates an exemplary transceiver apparatus 200 that may be used as a transmitting apparatus or receiving apparatus in a multicarrier arrangement or system. The multicarrier apparatuses 102 and 104 illustrated in FIG. 1 may be implemented in the same or similar manner as the exemplary transceiver apparatus 200. To simplify the description of the implementations described herein, updating and synchronizing BATs will be discussed in connection with the apparatus 200. However, as should be understood, a first transceiver apparatus (e.g., a receiving transceiver) may initiate a BAT update procedure to be effected in a second transceiver apparatus (e.g., a transmitting transceiver) distinct from the first transceiver apparatus.

The transceiver apparatus 200 may include a transmitter 202 that incorporates a number of different elements. For example, the transmitter 202 may include an encoder 204, a modulator 206, a filter 208, an interface 210 and a controller 212. As used herein, the term "controller" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

Furthermore, the transmitter 202 may include one or more BATs 214 stored in storage. As used herein, the term "storage" and the like may refer to any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. The encoder 204 may be capable of receiving data that is for communication to a receiving device coupled to the transceiver apparatus 200 via a wireless or wireline medium 216. More specifically, the encoder 204 may be capable of translating incoming data bit streams into in-phase and quadrature components for each of the plurality of tones. The encoder 204 may be arranged to output a number of symbol sequences that are equal to the number of tones available to the system. The modulator 206 may be capable of receiving symbol sequences to produce a modulated signal in the form of a discrete multi-tone signal. The modulator 206 may pass the modulated signal to the filter 208 to undergo various filtering and then the filtered signal may be passed to the interface 210 for communication over the medium 216 to a receiving device.

The transceiver apparatus 200 may also include a receiver 218 that is capable of receiving modulated multi-tone signals communicated over the medium 216. The receiver 218 may include an interface 220, a filter 222, a demodulator 224, a decoder 226 and a controller 228. Furthermore, the receiver 218 may include one or more BATs 230 stored in storage. Signals received by the receiver 218 may be passed to the filter 222 via the interface 220. After receive signals undergo filtering by way of the filter 222, the filtered signals may be demodulated by the demodulator 224. The demodulated signals may be passed to and processed by the decoder 226. The decoder 226 produces data bit streams for consumption by a computing device, or the like. Effectively, the demodulator 224 and the decoder 226 perform the opposite functions of the modulator 206 and the encoder 204, respectively.

The receiver 218 may monitor channel performance and control and adapt bits and gain allocated to one or more of the tones associated with a channel of the multicarrier system. In particular, the receiver 218, by way of the controller 228, may monitor the tones and the signals carried thereon to determine the necessity of a change in the BATs 230 and 214 associated with the receiver 218 and transmitter 202, respectively. In one implementation, the BATs 214 and 230 may store the number of bits and gain to be used by each tone in the multicarrier system. Exemplary procedures for effecting bit allocation and gain modification in the BATs 214 and 230 are described later herein. In another implementation, the receiver 218, by way of the controller 228, may monitor the channel to determine if it may be beneficial to update one or more channel adaptation parameters. Such parameters may include a BAT grouping factor, guard interval, Forward Error Correction (FEC) rate, FEC block size, Power Spectral Density (PSD) ceiling, or the like. Exemplary procedures for modifying or otherwise updating such parameters are also described later herein.

As described, the receiver 218, by way of the controller 228 or another element associated therewith, may monitor the tones and the signals carried thereon. In one implementation, the controller 228 may determine the noise level, gain and phase shift on each of the tones. The object may be to estimate the Signal-to-Noise Ratio (SNR) for each of the tones. Other parameters could be monitored as well or in place of the parameters described. The determination of which tones to transmit the encoded data over as well as how much data to transmit over each tone may be determined on the basis of several factors. The factors may include detected communication medium or channel quality parameters, tone gain parameter, a permissible power mask, and the desired maximum bit error rates. It is noted that the factors need not be constant between tones and indeed may even vary during use. Most notably, the communication medium or channel quality parameters may be repeatedly checked, and adjustments in the modulation scheme made in real time to adjust the modulation as the communication medium or channel quality over various tones changes during use.

In one implementation, the receiver 218 of the receiving transceiver 102 and the transmitter 202 of the transmitting transceiver 104 may store copies of the same BATs and both use them for decoding/demodulating and encoding/modulating, respectively. The controllers 228 of transceiver 102 and 212 of transceiver 104, respectively, aid in enabling proper decoding/demodulating and encoding/modulating. An exemplary BAT table is illustrated in FIG. 3, which is described hereinafter. As will be appreciated, successful monitoring may determine changes in BATs 214 of transceiver 104 and 230 of transceiver 102 that cause improvement in the transmission and reception performance as the medium 216, or more generally the channel, undergoes change.

FIG. 3 illustrates an exemplary Bit Allocation Table (BAT) 300 that may be updated in accordance with the described implementations. In one implementation, the exemplary transceiver apparatus 200 illustrated in FIG. 2 may include a plurality of such BATs 300. Moreover, the multicarrier apparatuses 102 and 104 illustrated in FIG. 1 may also include a plurality of such BATs 300. The BAT 300 may include tone column 302, a bits column 304 and a gain column 306. The tone column 302 may contain tone index identifying the frequency of each tone or sub-channel that is available for a particular type of multicarrier system (e.g., G.hn, VDSL, 802.11, 802.16, etc.). Each tone in the tone column 302 may include a corresponding bit allocation, which is identified in the bits column 304. The number of bits allocated to a particular tone generally varies based on communication medium or channel conditions, desired transmission rate, the protocol being used, etc. By way of example, the number of bits allocated to each tone may vary in the range of 0 to 12 for some transmission schemes and 0 to 15 for other transmission schemes. Again, these numbers may vary broadly in other systems. In addition, each tone entry in the tone column 302 generally includes a gain allocation that defines the transmit energy level on an associated tone. The gain allocation for each tone is typically contained in the gain column 306. If an associated receiver or transmitter includes a plurality of BATs 300, each BAT 300 may be assigned a unique BAT identification (BAT ID) in order to differentiate the plurality of stored BATs 300.

Exemplary procedures are described below. It should be understood that certain acts need not be performed in the order described, and may be modified, and/or may be omitted entirely, depending on the circumstances. The acts described may be implemented and executed by a computer, processor or other computer device, such as a wireless or wireline device, based on instructions stored on one or more computer-readable storage media. The computer-readable storage media can be any available media that can be accessed by a computer device to implement the instructions stored thereon. As used herein, the term "instructions", "computer program" or "software" is meant to include any sequence or human or machine cognizable acts which perform a function. The exemplary procedures and acts may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like. Furthermore, the disclosed exemplary procedures and associated acts may be hardware and firmware as well, or alternatively as some combination thereof.

Figure 4:
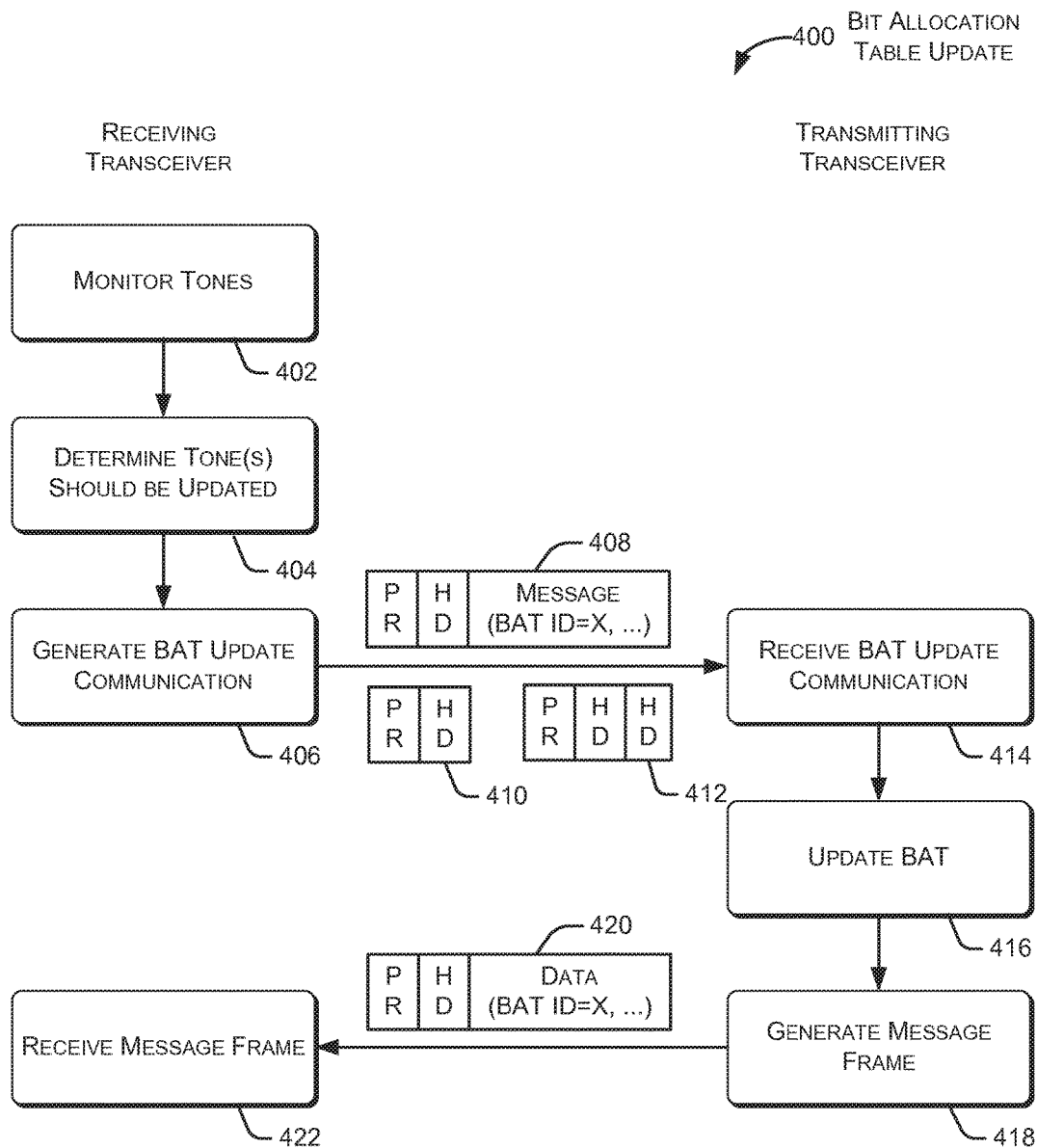
FIG. 4 is a flow diagram of a procedure useable to update bits and gains associated with tones in at least one BAT.

FIG. 4 is a flow diagram of a procedure 400 useable to update bits and gains associated with one or more tones indexed in at least one BAT. The procedure is compatible with apparatuses, elements and wireless networks illustrated in FIGS. 1-2, as well as entities and devices other than those illustrated and discussed herein. The procedure 400 may be used to update a BAT of the type illustrated in FIG. 3. However, the procedure 400 may also be used to update BATs having different structure and including other data. The procedure 400 may also be used to update channel adaptation parameters other than or in addition to BATs. Such parameters may include a BAT grouping factor, guard interval, FEC rate, FEC block size, PSD ceiling, or the like.

At Act 402, a transceiver receiving signals on a plurality of tones begins to monitor the performance of one or more of the plurality of tones, communication medium, communication channel and the like. In one implementation, a controller of the type described herein monitors one or more of the plurality of tones to ascertain if it may be beneficial to modify the bit, gain and/or other values associated with tones indexed in a BAT associated with a transceiver transmitting the received signals. The controller may also monitor other channel adaptation parameters. These parameters include a BAT grouping factor, guard interval, FEC rate, FEC block size, PSD ceiling, or the like. The receiving transceiver and the transmitting transceiver may store copies of the same BATs and both use them for encoding and decoding, respectively. As can be appreciated, successful monitoring may determine changes in these BATs and other parameters that may cause improvement in the transmission performance as the communication medium or channel changes with time.

At Act 404, the receiver may determine that bits and gain values associated with one or more tones should be modified or updated based on the monitoring performed by the controller. In addition, the receiver may determine that one or more channel adaptation parameters should be modified or updated based on the monitoring performed by the controller. At Act 406, a communication, which may be in the form of a message frame 408, an R2T frame using a header 410 or an R2T frame using one or more extended headers 412, is generated. As used herein, a message frame denotes any frame carrying a user data or control/management data in a payload of the frame. As used herein, an R2T frame denotes any frame transmitted by the receiving transceiver to the transmitting transceiver that does not carry a payload. One such R2T frame is an ACK frame used by the receiving transmitter to indicate to the transmitting transceiver the integrity of one or more transmitted messages. The communication may include BAT information that may be used to update a BAT table. Moreover, the communication may include updated or revised channel adaptation parameters, such as a BAT grouping factor, guard interval, FEC rate, FEC block size, and PSD ceiling. The communication may be sent to the transmitting transceiver. In one implementation, a controller of the type described herein generates the communication.

In one implementation, the message frame 408 includes a preamble (PR), a header (HD) and a payload portion that includes a partial BAT that may be used to update a BAT stored in an apparatus receiving the message frame 408. The partial BAT may include a BAT ID that is associated with a BAT currently used by the transmitting transceiver, one or more tone indices, a bit value to be assigned to each tone associated with the one or more tone indices, a gain value to be assigned to each tone associated with the one or more tone indices, and/or other data. The payload portion of the message frame 408 may also include one or more channel adaptation parameters useable to update one or more such parameters used in connection with the communication channel. In another implementation, the R2T frame 410 includes a PR and one HD. The HD includes a partial BAT that may be used to update a BAT stored in an apparatus receiving the R2T frame 410. The HD of the R2T frame 410 may also include one or more channel adaptation parameters useable to update one or more such parameters used in connection with the communication channel. In another implementation, the R2T frame 412 includes a PR and two HRs. The additional HD is an extended frame header that includes a partial BAT that may be used to update a BAT stored in an apparatus receiving the R2T frame 412. Here again, the additional HD may also include one or more channel adaptation parameters useable to update one or more such parameters used in connection with the communication channel. The partial BAT may include a BAT ID that is associated with a BAT currently used by the transmitting transceiver, one or more tone indices, a bit value to be assigned to each tone associated with the one or more tone indices, a gain value to be assigned to each tone associated with the one or more tone indices, and/or other data. In another implementation, one or more of the frames 408, 410 and 412 may include a channel adaptation confirmation indicator (CA ID), which may be a random, deterministic, or other unique number or value, that is associated with the partial BAT. The CA ID may be used by the transmitting transceiver to confirm back to the receiving transceiver that the partial BAT associated with a given frame was used to update a relevant BAT. Moreover, the use of the CA ID may prevent synchronization losses if multiple partial BAT updates and channel adaptations are executed successively. In yet another implementation, the partial BAT data, channel adaptation parameters and the like may be associated with a CE_PartialParamUpdate data structure.

At Act 414, the transmitting transceiver receives the communication including the BAT information that may be used to update a BAT table. At Act 416, the transmitting transceiver uses the BAT information to update a relevant BAT table stored in the transmitting transceiver. In particular, the transmitting transceiver may reference the BAT information received in the communication to determine bit and gain values, and/or other such data that should be applied to tone indices listed in a relevant BAT table stored in the transmitting transceiver. In one implementation, the transmitting transceiver uses the BAT ID received in the BAT information to identify that a current BAT table is to be updated.

At Act 418, the transmitting transceiver generates a message frame 420 that may include data generated (e.g., encoded and modulated) in accordance with the updated BAT. In one implementation, a HD associated with the message frame 420 includes the CA ID that along with BAT ID confirms that the relevant BAT has been updated and the data associated with the frame 420 was generated in accordance with the updated BAT. At Act 422, the receiving transceiver receives the frame 420 that was generated in accordance with the updated BAT. The receiving transceiver may reference the CA ID and/or the BAT ID to confirm that the relevant BAT has been updated and the data associated with the frame 420 was generated in accordance with the updated BAT.

As should be understood from the foregoing, the implementations described herein may offer numerous advantages over conventional BAT replacement procedures. By way of example, the implementations described herein may reduce the ordinary amount of time required to allocate bits in a channel comprised of a plurality of tones. Furthermore, because the implementations herein may make use of existing frame and message formats, the execution and reallocation of bits and gains may be extremely efficient and quick. Additionally, the use of the implementations described herein may eliminate having to pass additional information prior to the execution of a channel adaptation process. That is, unlike conventional procedures for channel adaptation, the implementations described herein may eliminate control messages used to initiate and confirm a channel adaptation procedure. In addition, the implementations described herein may improve the reliability of a connection in situations demanding a rapid channel adaptation, thereby reducing the necessity and frequency of retraining transceivers.

ITU G.Hn: Fast Channel Adaptation Via Partial BAT Update

The following disclosure may relate to one or more future Standards Contributions. The disclosure is provided as non-limiting exemplary information that may be related to one or more implementations described herein.

The following Example(s) illustrates how to add a simple auxiliary mechanism to the existing channel estimation protocol to facilitate fast channel adaptation, suitable for all media types. The scheme employs at least two different ways to update a BAT based on existing tools.

Fast and efficient channel adaptation is important in G.hn because it operates over various media with different channel characteristics such as coax cable, phone line, and power line. For a slowly changing channel, we need an efficient scheme to adjust the BAT (as opposed to replacing the entire BAT). Under rapidly changing channel conditions, we need a fast and efficient scheme. The following enhances both speed and efficiency of the existing channel adaptation mechanism.

Example

Add a new (and relatively shorter) management message, CE_PartialParamUpdate.ind to carry a partial BAT.

Add a mechanism for piggy-backing the partial BAT in an extended PHY-frame header of ACK frame. Note that the content or format of the partial BAT piggy-backed in ACK frame may be different from that of CE_PartialParamUpdate.ind message.

By way of this Example, a simple synchronization mechanism and process is provided between the transmitter and the receiver so that the used (active) BAT can be updated on the fly.

Order of execution:
  The receiver may send the partial BAT update information for a given BAT_ID that is currently used by the transmitter.
  The receiver sets the unique ID associated with the partial BAT update (CA_ID).
  Upon the reception of this information, the transmitter is allowed to update the parameter immediately (i.e., for the next frame transmission) as instructed by the receiver.
  The transmitter conveys CA_ID over its PHY-frame header of the MSG frame to indicate the receiver that the proposed change is applied for the frame.

The above implementations or combinations thereof may be incorporated into any Standard. The Home Network standard, for example, for which the inventor herein contributed the substance of on Channel adaptation via partial BAT update (§ 8.11.4 G.hn, as of this writing). As a basis of discussion, the channel estimation protocol will now be described that provides the procedure of measuring the characteristics of the channel between the transmitter (source) and the receiver (destination) nodes. The procedure involves initiation of channel estimation, transmissions of PROBE frames, and selection of parameters.

Channel estimation can be done in two phases:
Channel discovery—initial channel estimation
Channel adaptation—subsequent channel estimation to adapt changing channel The procotols used for channel discovery and channel adaptation can be started either by the transmitter or by the receiver. The core part of the channel estimation protocol is always initiated by the receiver (receiver-initiated channel estimation). The transmitter can request the receiver to initiate channel estimation (transmitter-requested channel estimation).

During the initiation process, the transmitter and receiver jointly determine input parameters for channel estimation such as channel estimation window (a fraction of a MAC cycle over which channel estimation should be executed, the minimum value of G ($G_{min}$), and parameters for the PROBE frame. The receiver selects the BAT_ID associated with the BAT to be updated. This BAT_ID is used for an identifier for a particular channel estimation process throughout the rest of the process.

Once the channel estimation process is initiated, the receiver may request the transmitter to send one or more PROBE frames. The receiver can change parameters of a PROBE frame at each request. If the receiver requests a PROBE frame without specifying its parameters (e.g., probe request via ACK_CE_CTRL), the transmitter transmits the PROBE frame using parameters previously selected by the receiver. The receiver is not required to request PROBE frames if it chooses other means such as MSG frames or PROBE frames transmitted to other nodes to estimate the channel. The protocol provides numerous options to expedite the channel estimation process for faster channel adaptation.

The receiver terminates the channel estimation process by sending the outcome of channel estimation to the transmitter. This includes, but is not limited to, the following parameters:
  Bit allocation table (BAT)
  FEC coding rate and block size
  Guard interval for payload
  PSD ceiling The receiver may cancel the channel estimation process without generating new channel estimation parameters. The procedure for receiver-initiated channel estimation process provides:
  1. The receiver initiates the channel estimation process by sending the transmitter CM_CE_Initiation.req message (channel estimation initiation).
  2. Upon reception of the channel estimation initiation, if the transmitter does not have transmit opportunities for a given channel estimation window, it shall request the domain master to allocate bandwidth for PROBE frame transmission by sending CE_ProbeSlotRequest.ind message (bandwidth request).
  3. Depending on the availability of bandwidth, the transmitter may grant or reject the channel estimation initiation request by sending the receiver CM_CE_Initiation.cnf message (channel estimation confirmation).
  4. Upon reception of the channel estimation confirmation, the receiver may request the transmitter to send additional PROBE frames by sending CM_CE_ProbeRequest.ind message (PROBE frame request).
  5. Upon reception of the PROBE frame request, the transmitter shall transmit the PROBE frame as the receiver requested (PROBE frame transmission).
  6. Steps 4 and 5 can repeat until the receiver sends the transmitter the final outcome of channel estimation using the CE_ParamUpdate.ind message (channel estimation completion). Steps 4 and 5 may be skipped altogether if the receiver does not need additional PROBE frames.
  7. The receiver may cancel the channel estimation process after it receives the channel estimation confirmation by sending CM_CE_Cancellation.ind message or by setting a flag in an ACK frame (channel estimation cancellation).
  8. Upon reception of CE_ParamUpdate.ind message, the transmitter may send CE_ProbeSlotRelease.ind message to the domain master to release the bandwidth used for PROBE frame transmission (bandwidth release).

The transmitter can send an MSG frame with the existing settings (e.g., old runtime BAT or predefined BAT) at any time during this process.

The receiver initiates the channel estimation process by sending the transmitter CM_CE_Initiation.req message. This message is carried using a CTMG frame. The receiver shall select CE_GRP_MIN ($G_{min}$), which indicates the minimum value of GRP_ID (G) associated with the BAT to be updated. The receiver shall select CE_STIME and CE_ETIME, which determines the start and end time of the channel estimation window. During the rest of channel estimation process, the transmitter sends PROBE frames inside this window. The receiver selects CE_BAT_ID from ones that are currently invalid. This value shall be used to differentiate multiple channel estimation processes being executed at the same time. The receiver may request PROBE frame transmission by setting CE_PRB_RQST field. The CE_PRB_PARM field specifies parameters for PROBE frame.

The receiver may resend CM_CE_Initiation.req message, if it does not receive CM_CE_Initiation.cnf message within 200 msec. If the transmitter does not have transmit opportunities inside a given channel estimation window, it requests the domain master to allocate bandwidth for PROBE frame transmission by sending CE_ProbeSlotRequest.ind message. The transmitter provides the domain master the channel estimation identifier (i.e., CE_BAT_ID), channel estimation window (CE_STIME and CE_ETIME), and PROBE frame parameters (CE_PRB_PARM) as provided by CM_CE_Initiation.req message.

The domain master allocates bandwidth so that at least one PROBE frame with requested parameters can be transmitted during the channel estimation window. The transmitter confirms the channel estimation process by sending the receiver CM_CE_Initiation.cnf message.

The transmitter indicates whether it grants or rejects the channel estimation initiation request by setting CE_CNF_TYPE and CE_CNF_CODE. The transmitter sets CE_BAT_ID to the value selected by the receiver via channel estimation initiation. The transmitter finalizes CE_GRP_MIN, which is larger than or equal to the one indicated by the receiver. The transmitter may use any value of G (sub-carrier grouping) that satisfies the following conditions: $G(t_i) \geq G_{min}$, and $G(t_{i+1}) \geq G(t_i)$ where $G(t_i)$ denotes the value of G at arbitrary time $t_i$, and $t_i < t_{i+1}$. If the transmitter uses $G > G_{min}$, the new BAT (B') is formed by decimating the old BAT (B) by taking the minimum BAT entry from the original group of sub-carriers. That is, the new bit allocation entry for sub-carrier i, $B'_i = \min\{B_i\}$ where $i = G_j, G_{j+1}, \ldots, G_{j+G-1}$, and $j = 0, 1, \ldots, (N/G)-1$.

If the receiver has requested one or more PROBE frames in CM_CE_Initiation.req message, then the transmitter sends CM_CE_Initiation.cnf message over the first PROBE frame (i.e., CMPL of CM_CE_Initiation.cnf message is carried in PRB_CE_CNF field of PROBE frame). This PROBE frame contains the PROBE symbols as requested in CM_CE_Initiation.req message. If the receiver has not requested PROBE frames, the transmitter sends CM_CE_Initiation.cnf message using a CTMG frame. The transmitter shall send CM_CE_Initiation.cnf message within 100 msec after it receives CM_CE_Initiation.req message.

Once channel estimation initiation confirmed, the receiver requests the transmitter to send additional PROBE frames by sending CM_CE_ProbeRequest.ind message. This message is carried using a CTMG frame. The receiver requests specific parameters of the PROBE frame via PROBE request parameter fields of CM_CE_ProbeRequest.ind message. Alternatively, the receiver requests PROBE frames by using the ACK_CE_CTRL field in the PHY-frame header of an ACK frame designated to the transmitter node.

The receiver may not request PROBE frames at all if it uses MSG frames to estimate the channel. Upon reception of the PROBE frame request, the transmitter transmits PROBE frames as the receiver requested. If the receiver requests a PROBE frame via ACK_CE_CTRL, the transmitter transmits the PROBE frame using parameters previously selected by the receiver, that is the parameters selected in the latest PROBE frame request (CM_CE_ProbeRequest.ind) or channel estimation initiation (CM_CE_Initiation.req). The transmitter uses the default parameters if the receiver has not previously indicated these parameters.

At any time after channel estimation initiation is confirmed, the receiver may send the transmitter the outcome of channel estimation using the CE_ParamUpdate.ind message. Upon reception of CE_ParamUpdate.ind message, the transmitter incorporates the new channel estimation parameters (new BAT, etc.) as soon as possible.

If the transmitter does not receive any frame or message related to channel estimation in the duration of 200 m sec after channel estimation confirmation, it sends the receiver a CE_ParamUpdateRequest.ind message to request to resend the result of channel estimation. At any time after channel estimation initiation is confirmed, the receiver may cancel the channel estimation process using CM_CE_Cancellation.ind message. This message is carried using a CTMG frame. Alternatively, the receiver may use the ACK_CE_CTRL_TYPE field in an ACK frame to indicate cancellation. In either case the channel estimation is finished without generating a new BAT.

Upon reception of the CE_ParamUpdate.ind, the transmitter may request the domain master to release bandwidth previously assigned for PROBE frame transmission by sending CE_ProbeSlotRelease.ind message. The transmitter provides the domain master the channel estimation identifier (i.e., CE_BAT_ID) and channel estimation window (CE_STIME and CE_ETIME) associated with the channel estimation process. The domain master releases bandwidth additionally assigned to the transmitter for PROBE frame transmission over a given channel estimation window.

The following procedure describes the transmitter-requested channel estimation process:
 1. The transmitter requests channel estimation by sending the receiver CM_CE_Request.ind message.
 2. The rest of the procedure is the same as described above (step 1 through step 8).

The transmitter can send an MSG frame with the existing settings (e.g., old runtime BAT or pre-defined BAT) any time during this process.

The transmitter triggers the channel estimation process by sending the receiver CM_CE_Request.ind message. This message is carried using a CTMG frame. The transmitter may specify the channel estimation window (CE_STIME & CE_ETIME). In this case the receiver shall use the same channel estimation window as the transmitter requested. Otherwise, the receiver determines the channel estimation window at its own discretion.

It is not required to exchange PROBE frames between transmitter and receiver in order to exchange a new BAT between them. The receiver sends a new BAT at any time to the transmitter by sending a CE_ParamUpdate.ind message, provided that the BAT_ID is invalid at the time of sending the new BAT and the number of valid BAT_IDs after adding this one is less than or equal to the MAX_NUM_BAT_ID value sent by the transmitter. The receiver may use MSG frames or PROBE frames transmitted to other nodes to estimate the channel.

Within this framework, the BAT according to the above described implementations is updated, at least partially, in the G.hn environment as follows. The transmitter and/or receiver that communicate with each other by establishing a common runtime BAT updates a portion of the BAT at any time during its usage. The receiver initiates the partial BAT update (PBU) by sending PBU information in the management message.

The process of partial BAT update is described as follows:
 1. At any time during communication, the receiver sends the PBU request for the BAT currently used by the transmitter. The PBU request contains the new valid BAT_ID (N_BAT_ID), old BAT_ID (O_BAT_ID) associated with the BAT to be updated, and bit allocation changes
 2. Upon reception of the PBU request, the transmitter updates the BAT associated with the O_BAT_ID, and assigns N_BAT_ID to the updated BAT. After receiving the first MSG frame using the N_BAT_ID, the receiver considers O_BAT_ID is invalid.
 3. After transmitting the PBU request, the receiver infers loss of the PBU request if either of the following conditions is satisfied:
  a. Five MSG frames using the same O_BAT_ID are received from the transmitter,
  b. No MSG frame with N_BAT_ID is received from the transmitter in 100 msec and one MSG frame is received after this time with O_BAT_ID.
 4. The receiver may send another PBU request after confirming that the transmitter incorporated the previous PBU request or after inferring that the previous PBU request was lost.

The receiver may send the PBU request using the management message, CE_PartialBatUpdate.ind. Upon reception of CE_PartialBatUpdate.ind message, the transmitter should immediately incorporate new channel estimation parameters.

Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

The invention claimed is:

1. An apparatus comprising:
 a processor configured to execute instructions to process signals to be transmitted over a network;
 a computer readable storage storing the instructions including:
  an instruction to process the signals in accordance with a bit allocation table (BAT) having bit number values identifying a number of bits allocated to subcarriers of the signals, the BAT identified by a BAT identification (BAT ID);
  an instruction to receive a partial BAT message with a new BAT ID, the partial BAT message indicating one or more new bit number values for less than all of the bit number values of the BAT;
  an instruction to update the BAT with the one or more new bit number values; and
  an instruction to include the new BAT ID in a frame to be transmitted over the network.

2. The apparatus according to claim 1, wherein the storage further includes an instruction to include payload data in the frame.

3. The apparatus according to claim 1, wherein the storage further includes an instruction to generate a confirmation indicator indicating the BAT was updated with the new bit number values.

4. The apparatus according to claim 1, wherein the instruction to generate a frame includes the BAT ID in a header of the frame.

5. The apparatus according to claim 1, wherein the storage further includes an instruction to generate a confirmation indicating a number of BATs that are valid.

6. The apparatus according to claim 1, wherein the instruction to generate a frame indicates that the BAT was updated.

7. The apparatus according to claim 1, wherein the storage further includes an instruction to receive a channel estimation request.

8. The apparatus according to claim 1, wherein the storage further includes an instruction to receive a channel estimation parameter update including the one or more new bit number values.

9. The apparatus according to claim 1, wherein the storage further includes an instruction to generate a slot request signal based on the one or more new bit number values.

10. The apparatus according to claim 1, wherein the new BAT ID is a channel estimation confirmation signal.

11. The apparatus according to claim 1, wherein the storage further includes an instruction to cancel the update of the BAT in response to a cancel message.

12. The apparatus according to claim 1, wherein the storage further includes an instruction to again receive the one or more new bit number values after 200 ms.

13. The apparatus according to claim 1, wherein the storage further includes an instruction to modulate the frame according to an orthogonal frequency division multiplexing (OFDM) modulation protocol.

14. The apparatus according to claim 13, wherein the protocol is selected from the group consisting of ITU G.hn, G.hnem, HomePlug® AV, MoCA, IEEE 802.11 and IEEE 802.16.

15. The apparatus according to claim 1, wherein the processor is part of a domain master.

16. The apparatus according to claim 1, wherein the network is a power line network.

17. An apparatus comprising:
a processor configured to execute instructions to process signals to be transmitted over a network;
a computer readable storage storing the instructions including:
an instruction to process the signals in accordance with a bit allocation table (BAT) having bit number values identifying a number of bits allocated to subcarriers of the signals, the BAT identified by a BAT identification (BAT ID);
an instruction to transmit a partial BAT message with a new BAT ID, the partial BAT message indicating one or more new bit number values for less than all of the bit number values of the BAT;
an instruction to receive a frame including the new BAT ID to be transmitted over the network.

18. The apparatus according to claim 17, wherein the partial BAT message is a partial BAT update request.

19. The apparatus according to claim 17, wherein the storage further includes an instruction to receive a confirmation indicator indicating the BAT was updated with the new bit number values.

20. The apparatus according to claim 17, wherein the storage further includes an instruction to receive a confirmation indicating a number of BATs that are valid.

21. The apparatus according to claim 17, wherein the instruction to receive a frame indicates that the BAT was updated.

22. The apparatus according to claim 17, wherein the storage further includes an instruction to transmit a channel estimation request.

23. The apparatus according to claim 17, wherein the storage further includes an instruction to transmit a channel estimation parameter update including the one or more new bit number values.

24. The apparatus according to claim 17, wherein the storage further includes an instruction to receive a slot request signal based on the one or more new bit number values.

25. The apparatus according to claim 17, wherein the new BAT ID is a channel estimation confirmation signal.

26. The apparatus according to claim 17, wherein the storage further includes an instruction to cancel the update of the BAT.

27. The apparatus according to claim 17, wherein the storage further includes an instruction to again transmit the one or more new bit number values after 200 ms.

28. The apparatus according to claim 17, wherein the storage further includes an instruction to demodulate the frame according to an orthogonal frequency division multiplexing (OFDM) modulation protocol.

29. The apparatus according to claim 28, wherein the protocol is selected from the group consisting of ITU G.hn, G.hnem, HomePlug® AV, MoCA, IEEE 802.11 and IEEE 802.16.

30. The apparatus according to claim 17, wherein the processor is part of a domain master.

31. The apparatus according to claim 17, wherein the network is a power line network.

* * * * *